US008583796B2

(12) United States Patent
Nguyen

(10) Patent No.: US 8,583,796 B2
(45) Date of Patent: Nov. 12, 2013

(54) DATA SOURCE INTERFACE ENHANCED ERROR RECOVERY

(75) Inventor: Lynh Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2099 days.

(21) Appl. No.: 09/750,475

(22) Filed: Dec. 28, 2000

(65) Prior Publication Data

US 2002/0040398 A1 Apr. 4, 2002

Related U.S. Application Data

(62) Division of application No. 09/612,534, filed on Jul. 7, 2000.

(51) Int. Cl.
*G06F 15/16* (2006.01)
(52) U.S. Cl.
USPC .......................... 709/226; 709/224; 709/228
(58) Field of Classification Search
USPC ............ 709/211, 217, 229, 224–228; 707/10, 707/102, 103–104, 104.1
See application file for complete search history.

(56) References Cited

U.S. PATENT DOCUMENTS

| 5,023,873 | A |   | 6/1991  | Stevenson et al. ............. 371/8.2 |
|-----------|---|---|---------|---------------------------------------|
| 5,388,243 | A |   | 2/1995  | Glider et al.                         |
| 5,475,601 | A | * | 12/1995 | Hwang ........................ 700/157 |
| 5,499,367 | A |   | 3/1996  | Bamford et al.                        |
| 5,561,763 | A | * | 10/1996 | Eto et al. ........................ 714/35 |
| 5,592,472 | A |   | 1/1997  | Grant et al.                          |
| 5,603,064 | A |   | 2/1997  | Bennett                               |
| 5,758,351 | A |   | 5/1998  | Gibson et al. ................. 707/104 |
| 5,761,507 | A |   | 6/1998  | Govett                                |
| 5,765,154 | A | * | 6/1998  | Horikiri et al. ................. 707/10 |
| 5,774,660 | A | * | 6/1998  | Brendel et al. ................ 709/201 |
| 5,812,748 | A | * | 9/1998  | Ohran et al. ....................... 714/4 |
| 5,826,021 | A | * | 10/1998 | Mastors et al. ............... 709/203 |
| 5,862,338 | A |   | 1/1999  | Walker et al.                         |
| 5,890,158 | A | * | 3/1999  | House et al. .................... 707/10 |
| 5,903,786 | A | * | 5/1999  | Goto ............................. 396/297 |
| 5,925,117 | A | * | 7/1999  | Kirby et al. ................... 710/303 |
| 5,930,786 | A |   | 7/1999  | Carino, Jr. et al.                    |

(Continued)

OTHER PUBLICATIONS

Renard., "Implementing a Web server on OS/390:Part IV—Interconnecting Web Applications with DB2 Databases or CICS Transaction Servers", Technical Support, Dec. 1998, Technical Enterprises, Inc. WWW.nasp.net, 4 pages.*

(Continued)

*Primary Examiner* — Patrice Winder
*Assistant Examiner* — Ebrahim Golabbakhsh
(74) *Attorney, Agent, or Firm* — Sughrue Mion, PLLC

(57) ABSTRACT

The invention provides for the connection of a plurality of remote applications with a data source, to maximize the speed and reliability of data transfer. An interface module interfaces with a remote application such as a web browser. A port module interfaces between interface module and a data source. A connection manager facilitates the interface between the interface module and the port module. The port module detects the unavailability of the data source in response to an initial request for the data source by the remote application. The port module may then dynamically detect the availability of the data source in response to a subsequent request for the data source and re-connect to the data source to the remote application in response to the subsequent request without having to reinitialize the connection manager.

13 Claims, 7 Drawing Sheets

(56) References Cited

U.S. PATENT DOCUMENTS

| | | | |
|---|---|---|---|
| 5,941,949 A | | 8/1999 | Pedersen |
| 5,960,424 A | | 9/1999 | Sadiq |
| 6,014,344 A | * | 1/2000 | Baker, III .................. 367/48 |
| 6,016,698 A | * | 1/2000 | Kasanami et al. ......... 73/504.14 |
| 6,026,413 A | * | 2/2000 | Challenger et al. .......... 707/202 |
| 6,076,092 A | * | 6/2000 | Goldberg et al. ......... 707/103 R |
| 6,088,796 A | * | 7/2000 | Cianfrocca et al. .......... 713/152 |
| 6,094,649 A | * | 7/2000 | Bowen et al. ................ 707/3 |
| 6,101,533 A | | 8/2000 | Brandt et al. |
| 6,101,542 A | | 8/2000 | Miyamoto et al. |
| 6,105,057 A | * | 8/2000 | Kuftedjian et al. .......... 709/213 |
| 6,112,196 A | * | 8/2000 | Zimowski et al. ............ 707/2 |
| 6,115,387 A | | 9/2000 | Egbert et al. |
| 6,134,588 A | * | 10/2000 | Guenthner et al. .......... 709/226 |
| 6,138,159 A | | 10/2000 | Phaat |
| 6,157,944 A | | 12/2000 | Pedersen |
| 6,175,842 B1 | * | 1/2001 | Kirk et al. .................. 715/513 |
| 6,178,433 B1 | * | 1/2001 | Nakamura et al. ........... 715/513 |
| 6,195,703 B1 | * | 2/2001 | Blumenau et al. .......... 709/238 |
| 6,199,110 B1 | * | 3/2001 | Rizvi et al. ................. 709/227 |
| 6,212,520 B1 | * | 4/2001 | Maruyama et al. ............ 707/10 |
| 6,247,055 B1 | * | 6/2001 | Cotner et al. ............... 709/227 |
| 6,253,199 B1 | * | 6/2001 | Wakio et al. ................ 707/3 |
| 6,263,330 B1 | * | 7/2001 | Bessette ..................... 707/4 |
| 6,279,001 B1 | * | 8/2001 | DeBettencourt et al. .............. 1/1 |
| 6,285,997 B1 | * | 9/2001 | Carey et al. .................. 707/4 |
| 6,317,786 B1 | * | 11/2001 | Yamane et al. .............. 709/224 |
| 6,339,771 B1 | | 1/2002 | Zimowski et al. |
| 6,378,005 B1 | | 4/2002 | Hyder et al. |
| 6,381,606 B1 | | 4/2002 | Carpenter et al. |
| 6,381,617 B1 | * | 4/2002 | Frolund et al. ................. 1/1 |
| 6,393,477 B1 | * | 5/2002 | Paxhia et al. ............... 709/223 |
| 6,411,623 B1 | * | 6/2002 | DeGollado et al. ......... 370/395.1 |
| 6,415,290 B1 | * | 7/2002 | Botts et al. .................. 707/10 |
| 6,424,358 B1 | | 7/2002 | DiDomizio et al. |
| 6,425,049 B1 | | 7/2002 | Yamamoto et al. |
| 6,446,109 B2 | | 9/2002 | Gupta |
| 6,456,308 B1 | * | 9/2002 | Agranat et al. ............... 715/854 |
| 6,490,610 B1 | * | 12/2002 | Rizvi et al. .................. 718/101 |
| 6,496,948 B1 | * | 12/2002 | Smorodinsky ................. 714/37 |
| 6,523,032 B1 | * | 2/2003 | Sunkara et al. ................ 707/8 |
| 6,526,413 B2 | * | 2/2003 | Schwitters et al. ........ 707/104.1 |
| 6,535,518 B1 | | 3/2003 | Hu et al. |
| 6,549,516 B1 | * | 4/2003 | Albert et al. ................ 370/236 |
| 6,567,849 B2 | * | 5/2003 | Ludovici et al. ............. 709/223 |
| 6,574,667 B1 | | 6/2003 | Blumenau et al. |
| 6,591,272 B1 | * | 7/2003 | Williams ................... 707/102 |
| 6,591,295 B1 | | 7/2003 | Diamond et al. |
| 6,601,086 B1 | | 7/2003 | Howard et al. |
| 6,615,264 B1 | | 9/2003 | Stoltz et al. |
| 6,618,727 B1 | * | 9/2003 | Wheeler et al. ............... 707/10 |
| 6,681,229 B1 | * | 1/2004 | Cason et al. ................. 707/101 |
| 6,689,224 B1 | * | 2/2004 | Hillman ........................... 134/6 |
| 6,697,073 B1 | * | 2/2004 | Kadota ........................ 345/501 |
| 6,701,352 B1 | * | 3/2004 | Gardner et al. ............... 709/218 |
| 6,714,979 B1 | * | 3/2004 | Brandt et al. ................ 709/225 |
| 6,717,913 B1 | * | 4/2004 | Ghahremani et al. ........ 370/230 |
| 6,725,227 B1 | * | 4/2004 | Li ................................. 707/102 |
| 6,738,817 B1 | * | 5/2004 | Chen et al. .................... 709/227 |
| 6,742,004 B2 | * | 5/2004 | Sabatini et al. ............. 707/104.1 |
| 6,742,036 B1 | * | 5/2004 | Das et al. .................... 709/226 |
| 6,757,868 B1 | | 6/2004 | Glaser et al. |
| 6,772,167 B1 | * | 8/2004 | Snavely et al. ............... 707/102 |
| 6,779,017 B1 | | 8/2004 | Lamberton et al. |
| 6,779,030 B1 | * | 8/2004 | Dugan et al. .................. 709/223 |
| 6,798,753 B1 | | 9/2004 | Doganata et al. |
| 6,839,757 B1 | | 1/2005 | Romano et al. |
| 6,892,240 B1 | * | 5/2005 | Nakajima ..................... 709/227 |
| 6,950,848 B1 | * | 9/2005 | Yousefi'zadeh .............. 709/203 |
| 6,970,913 B1 | * | 11/2005 | Albert et al. .................. 709/217 |
| 2001/0034733 A1 | * | 10/2001 | Prompt et al. ................ 707/102 |
| 2001/0034734 A1 | * | 10/2001 | Whitley et al. ............. 707/104.1 |
| 2001/0047417 A1 | * | 11/2001 | Hartmann et al. ............ 709/227 |
| 2002/0004796 A1 | * | 1/2002 | Vange et al. .................... 707/10 |
| 2002/0023158 A1 | | 2/2002 | Polizzi et al. |
| 2002/0026446 A1 | * | 2/2002 | Groos et al. ................. 707/102 |
| 2002/0104018 A1 | * | 8/2002 | Singhani et al. .............. 713/201 |
| 2002/0144157 A1 | * | 10/2002 | Zhao et al. ................... 713/201 |
| 2002/0145622 A1 | * | 10/2002 | Kauffman et al. ............ 345/723 |
| 2003/0140112 A1 | | 7/2003 | Ramachandran et al. |
| 2003/0200226 A1 | * | 10/2003 | Wells et al. ................. 707/104.1 |
| 2003/0233357 A1 | * | 12/2003 | Merenda et al. ................. 707/5 |
| 2005/0259682 A1 | | 11/2005 | Yosef |

OTHER PUBLICATIONS

Baker, "Changing Communication Environments in MosquitoNet", Computer Science and Electrical Engineering Dept. Standfo University, IEEE, 1995, pp. 68-68.*

Mukherjee, "Automating Forms Publihing with the Intelligent Filling Manager", IEEE, 1999, pp. I-308 to I-313.*

Lynh Nguyen; "Live-Connection System for Net.Data"; Net.Data @ IBM Software; pp. 1.

"Net.Data"; IBM Net.Data: More Information; pp. 1.

"IBM Net.Data"; IBM Security: Secure Way Product: Net.Data; pp. 1.

"Net.Data"; IBM Software: Database and Data Ma . . . roduct Family : Net Data : Overview; pp. 1.

"Net.Data™ Version 2 Deploying Dynamic Data to the Web"; IBM Net.Data Brochure: Deploying Dynamic Data to the Web; pp. 1-4.

"S/390 Division"; Enterprise Server Essentials; pp. 1-19.

"DB2 DataJoiner"; IBM DB2 DataJoiner Product News; pp. 1.

"DB2 Product Family"; IBM Software: Database and Data Ma . . . ent: DB2 Product Family: Overview; pp. 1-3.

"Question and Answer"; DB2 Server for VSE & VM—tune queries after migration; pp. 1-2.

"Celebrating IBM Data Management White Paper Sep. 1998"; IBM Data Management White Papers—Celebrating IBM Data Management; pp. 1-17.

"Data Management White Papers"; Data Management White Pages.; pp. 1-10.

"Introduction to Databases for the Web"; Introduction to Databases for the Web/ Hierarchical Databases; pp. 1-3.

"Introduction to Databases for the Web"; Introduction to Databases for the Web/Network Databases; pp. 1-2.

"Conditional Selection"; Learn SQL—Conditional Selection; pp. 1-2.

"Basics of the Select Statement"; Learn SQL—Basics of the Select Statement; pp. 1-2.

"The DB2 Family an Analysis of the Business Benefits Available"; DB2 for Business; Rob Hailstone; White Paper No. 98.01; pp. 1-40.

"Application Productivity Tools"; DB2 Notes (From White Paper); Susan Gausden; pp. 1-4.

"Application Productivity Tools"; DB2 notes (from white paper); Susan Gausden; pp. 1-46.

* cited by examiner

DATA SOURCE INTERFACE ENHANCED ERROR RECOVERY

This application is a divisional of application Ser. No. 09/612,534 filed on Jul. 7, 2000 for LIVE CONNECTION ENHANCEMENT FOR DATA SOURCE INTERFACE.

BACKGROUND OF THE INVENTION

1. Field of the Invention

The present invention relates generally to the management of a remote application connection to a data source. More particularly, the present invention relates to automatically re-establishing a connection to a data source accessible by a plurality of remote applications.

2. Relevant Technology

Databases are computerized information storage and retrieval systems. A Relational Database Management System (RDBMS) is a database system which uses relational techniques for storing and retrieving data. Relational databases are organized into tables consisting of rows and columns of data. A database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

A common application for databases relates to their interaction with Internet web browsers. A remote application such as a web browser may be used to query data from a data base. The data may then be used to create a table or other display of information on the web browser. This requires the transfer of data files and the formatting of data on the web browser. As the database is responsive to SQL and a web browser requires an HTML format, an interface module is required to enable interaction between the web browser and the database. One example of such an interface module is Net.Data available from IBM Corp., Armonk, N.Y.

Net.Data enables Internet and Intranet access to relational data on a variety of platforms. Net.Data incorporates a macrolanguage which supports both HTML and SQL and allows for interaction with universal web browsers and relational database systems. Net.Data operates in conjunction with a web server interface and supports client-side processing as well as server-side processing with languages such as Java, REXX, Perl and C++. Net.Data provides database connectivity to a variety of data sources including information stored in relational databases, flat files Java files, Perl files and the like.

Net.Data may support a variety of operating systems, including OS/2, AIX, Windows NT, HP-UX, Solaris, SCO, OS/390 and OS/400. Net.Data is further able to cache web pages to improve application performance, particularly when repeated requests are made for the same web page. Although this invention is compatible for use with an interface module such as Net.Data, other common gateway interface applications may be used with the present invention as well.

The interface module, which may be resident on a server, receives a query from a web browser, formats the query into SQL, and interacts with the database to receive data and create the table or other display of information. The interface module then uses its macrolanguage to present the data to the web browser in HTML format. The web browser, in turn, displays the data to a user of the remote application. In this manner, the interface module serves as an Internet gateway for accessing a database. However, every time the interface module connects to the database, requests a connection set up for the database, or sends a query to get data results from the data base, the interface must perform a set of time-consuming processes such as initialization, authorization, password confirmation, and the like. These processes can be time consuming, slowing down the entire system and process.

One attempt to overcome the problem of slower connections was to create a database manager to assist in synchronizing the connection of the interface modules with various ports of the database. However, in order to accommodate numerous web browsers, multiple applications of an interface module may be running, which may complicate the system. With increased use and complication, the system may be difficult to debug when a problem arises. Additionally, because everything runs through a connection manager, there are often miscommunications, synchronization problems, and bottlenecks between the user applications and the database.

If other databases were static and the data source became inactive or went down for whatever reason, the data manager would not be able to tell when the data source became active again. Thus, subsequent queries would still detect an inactive data source. In order to establish another connection with the data source, the whole system would have to be reinitialized. In situations where the data manager managed multiple users, this reinitialization would affect remote users whose connection to a data base was functioning normally.

Thus, it would be an advancement in the art to provide a system and method for connecting a plurality of remote applications with a data source in a simplified way.

It would be a further advancement in the art to provide such a system and method which would remove the likelihood of bottleneck by removing the necessity of routing every communication between the interface module and data source through the connection manager.

It would be a further advancement in the art to provide such a system and method that was dynamic and reliable and did not have to reinitialize if the data source became inactive or "went down."

Such an apparatus and method in accordance with the present invention is disclosed and claimed herein.

SUMMARY OF THE INVENTION

The present invention solves many or all of the foregoing problems by introducing a system and method by which a plurality of remote applications can connect with a data source without having all communication pass through a simple connection manager.

In one aspect of the invention, a system includes an interface module configured to interface with a remote application, a port module to interface between the interface module and the data source, and a connection manager module to facilitate the direct interface between the interface module and the port module. The connection manager may establish a connection between the connection manager and the port module. In one preferred embodiment, the port module reports its availability to the connection manager through this connection. This may be done by the connection manager retrieving a port module identifier, which identifies an available port module for connecting to the data source from a data structure. The port module identifier may then be passed to the interface module so that the interface module may connect directly to the port module, and thus, the data source.

The system in one preferred embodiment is configured to support HTML and provide interfacing between the requesting application and the data source. The interface module may be configured to convert the command from the remote application to a structured query language format to support interfacing with the data source.

In another aspect of the invention, a method for connecting a plurality of remote applications with a data source includes the steps of providing at least one interface module configured to interface with a remote application, providing at least one port module to interface between the interface module and the data source, and providing a connection manager to facilitate the interface between the interface module and the port module. In a preferred embodiment, the method further includes establishing a direct connection between the interface module and the port module. A port module identifier for an available port module may be returned to the interface module for direct connection between the interface module and the port module.

Thus, it is an object of the invention to provide for the management of the connection between remote applications and a data source which alleviates bottlenecks in the data flow. It is another object of the invention to simplify the connection process by reducing the steps in the connection process. It is yet another object of the invention to reduce the need to synchronize each module used in the connection process.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

Figure 1:
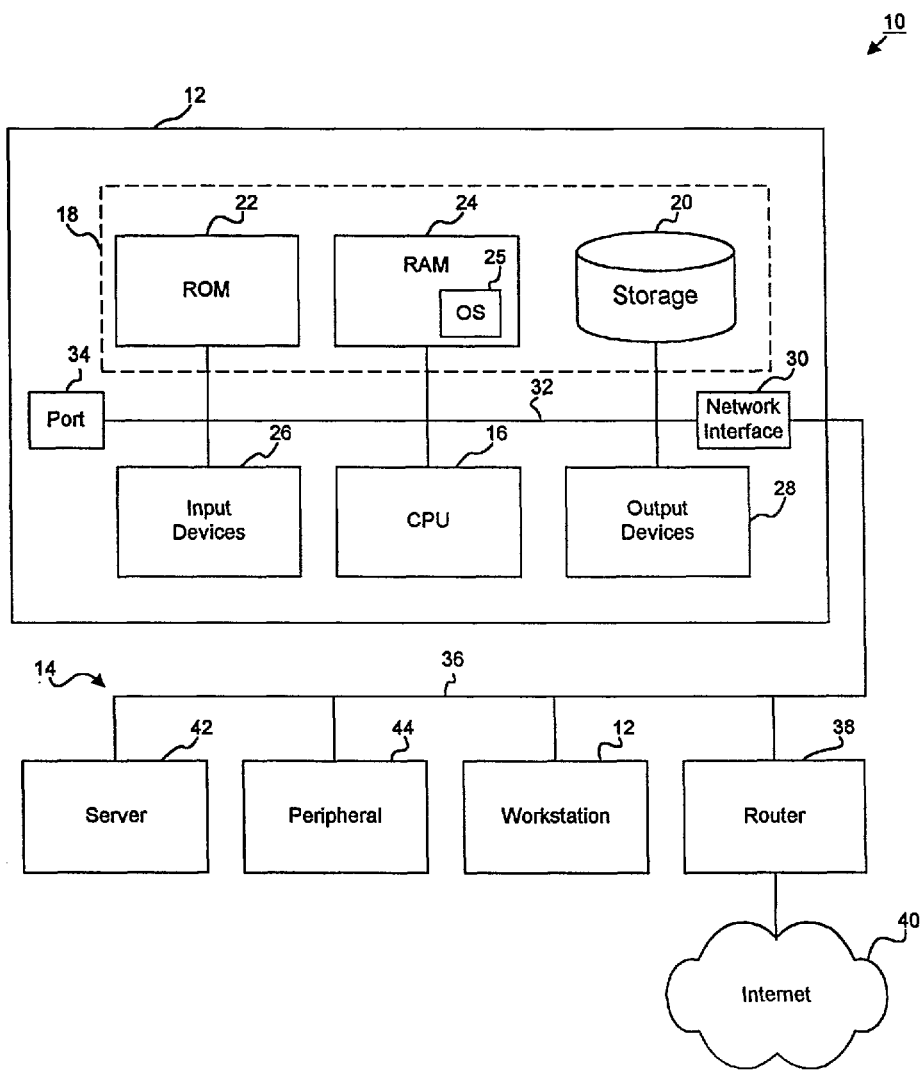
FIG. 1 is a schematic block diagram of a computer system suitable for implementing one embodiment of the invention.

Certain preferred embodiments of a system in accordance with the invention are now described with reference to the FIGS. 1-8, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the FIGS. 1-8, is not intended to limit the scope of the invention, as claimed, but is merely representative of presently preferred embodiments of the invention.

Various components of the invention are described herein as "modules." In various embodiments, the modules may be implemented as software, hardware, firmware, or any combination thereof. For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, procedure, function, or the like.

Nevertheless, the identified modules need not be located together, but may comprise disparate instructions stored in different locations, which together implement the described functionality of the module. Indeed, a module may comprise a single instruction, or many instructions, and may even be distributed over several different code segments, among different programs, and across several memory devices.

As used herein, the term executable code, or merely "executable," is intended to include any type of computer instruction and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure to be used, produced, or operated on during execution of an executable. The operational data may be collected as a single data set, or may be distributed over different locations including over different storage devices, and may at least partially exist merely as electronic signals on a system bus or network.

FIG. 1 is a schematic block diagram illustrating a computer system 10 in which a plurality of modules may be hosted on one or more computer workstations 12 connected via a network 14. The network 14 may comprise a wide area network (WAN) or local area network (LAN) and may also comprise an interconnected system of networks, one particular example of which is the Internet.

A typical computer workstation 12 may include a central processing unit (CPU) 16. The CPU 16 may be operably connected to one or more memory devices 18. The memory devices 18 are depicted as including a non-volatile storage device 20 (such as a hard disk drive or CD-ROM drive), a read-only memory (ROM) 22, and a random access memory (RAM) 24.

Preferably, the computer workstation 12 operates under the control of an operating system (OS) 25, such as OS/2®, WINDOWS NT®, WINDOWS®, UNIX®, and the like. In one embodiment, the OS 25 may provide a graphical user interface (GUI) to enable the user to visually interact with the modules of the present invention. In one embodiment, the OS 25 may be loaded from the non-volatile storage device 20 into the RAM 24 at the time the workstation 12 is booted.

The workstation 12 may also include one or more input devices 26, such as a mouse and/or a keyboard, for receiving inputs from a user. Similarly, one or more output devices 28, such as a monitor and/or a printer, may be provided within, or be accessible from, the workstation 12.

A network interface 30, such as an Ethernet adapter, may be provided for coupling the workstation 12 to the network 14. In one embodiment, the workstations 12 may be coupled to the network 14 via a distributed remote data architecture (DRDA). Where the network 14 is remote from the workstation 12, the network interface 30 may comprise a modem, and may connect to the network 14 through a local access line, such as a telephone line.

Within any given workstation 12, a system bus 32 may operably interconnect the CPU 16, the memory devices 18, the input devices 26, the output devices 28, the network interface 30, and one or more additional ports 34, such as parallel and serial ports.

The system bus 32 and a network backbone 36 may be regarded as data carriers. Accordingly, the system bus 32 and the network backbone 36 may be embodied in numerous configurations, such as wire and/or fiber optic lines, as well as electromagnetic channels using visible light, infrared, and radio frequencies.

In general, the network 14 may comprise a single local area network (LAN), a wide area network (WAN), several adjoining networks, an Intranet, an Extranet, or, as in the manner depicted, a system of interconnected networks such as the Internet 40. The individual workstations 12 may communicate with each other over the backbone 36 and/or over the Internet 40 using various communication techniques.

For instance, different communication protocols, e.g., ISO/OSI, IPX, TCP/IP, may be used within the network 14. In the case of the Internet 40, however, a layered communications protocol (i.e. TCP/IP) generally best enables communications between the differing networks 14 and workstations 12.

The workstations 12 may be coupled via the network 14 to application servers 42, and/or other resources or peripherals 44, such as scanners, printers, digital cameras, fax machines, and the like. External networks, may be coupled to the network 14 through a router 38 and/or through the Internet 40.

Figure 2:
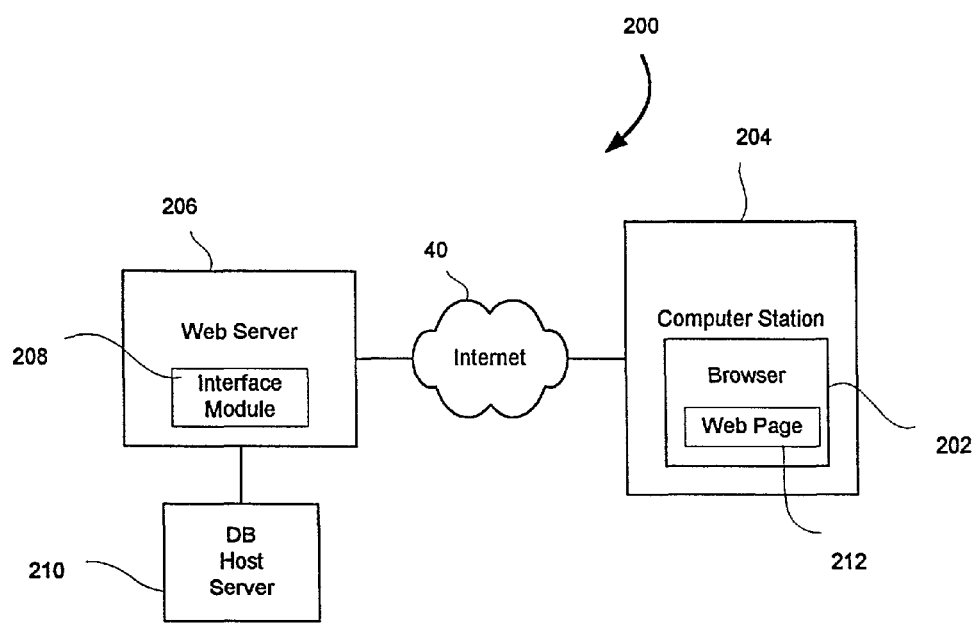
FIG. 2 is a schematic block diagram of one embodiment of a system in accordance with the present invention.

Referring now to FIG. 2, a data source connection management system 200 of the present invention is shown. In one embodiment, a web browser 202, is part of a computer station 204. The work station 204 may contain a plurality of modules (not shown) containing executable code and operational data suitable for operation within the memory devices 18 of FIG. 1. Of course, the memory devices 18 in which the modules of the present invention are located may also be distributed across both local and remote computer workstations 12 (FIG. 1). Likewise, two or more illustrated modules may be integrated into a single module without departing from the scope of the invention.

The present invention may be used over the Internet 40 in conjunction with a conventional web browser 202. The web browser 202 interprets HTML documents and formats and defines web pages 204. The web browser 202 may be at a remote workstation 12 (FIG. 1) and may be connected through the Internet 40 to a web server 206. The web server 206 stores HTML documents and interacts with the web browser 202 for downloading and uploading the documents for generation of web pages 212.

By way of example, a user at a remote application such as a web browser 202, may want to search for a book on a book store web server via the Internet. The web browser 202 connects to the server 206. The server 206 invokes an interface module 208, which allows the remote user to specify a keyword in a book title for example. The interface module 208 will pass the request to a data source 210 and receive data in return in the form of a data file. The file can then be used to create a web page 212 either at the server 206 or at the remote user's web browser 202.

Figure 3:
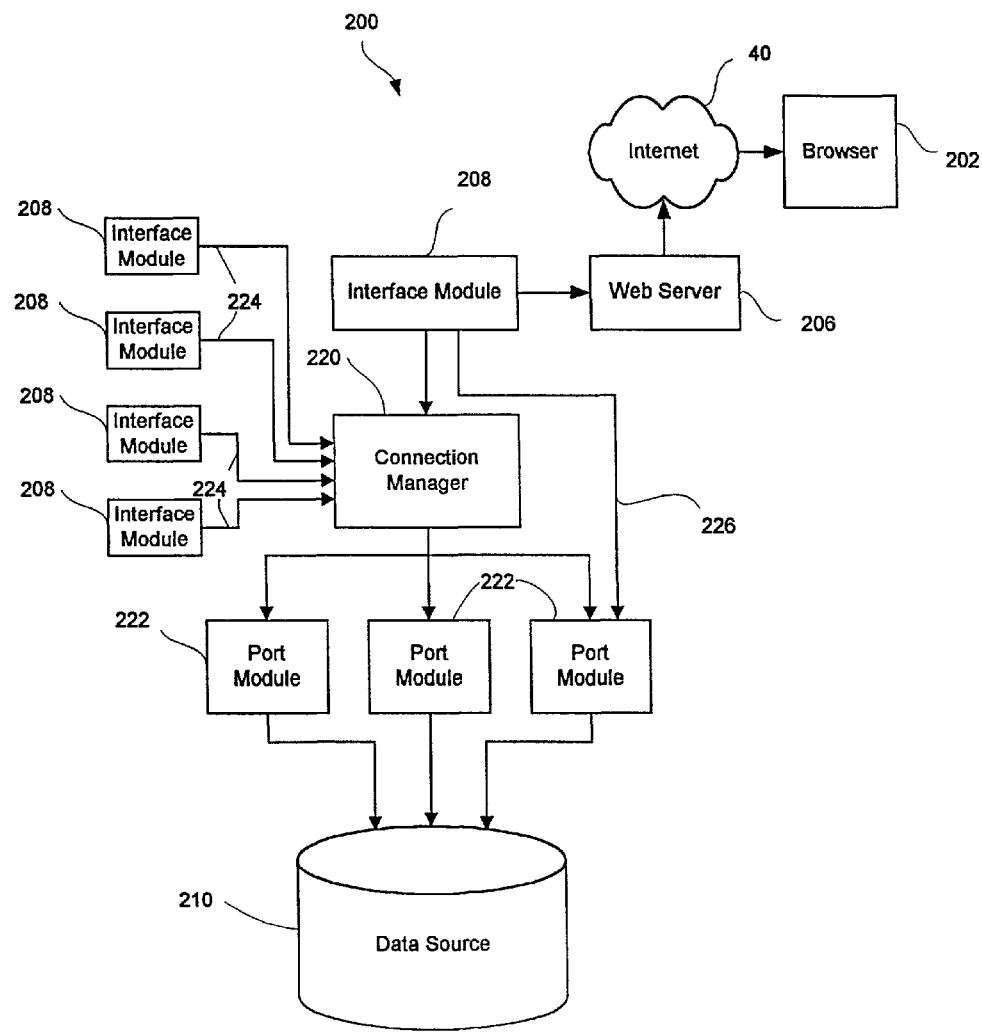
FIG. 3 is a schematic block diagram illustrating the components of one embodiment of a system for connecting a plurality of remote applications with a data source.

Referring now to FIG. 3, the system 200 of the present invention includes a connection manager 220. The connection manager 220 is a module that may include any type of computer instruction or computer executable code located within a memory device and/or transmitted as electronic signals over a system bus or network. It may comprise one or more logical blocks of computer instructions, which may be organized as an object, procedure, function, or the like. In one preferred embodiment, the connection manager 220 is running in the background on the server 206.

The connection manager 220 is also configured to interface with at least one interface module 208. The connection manager is preferably located at a predetermined address to allow the interface module 208 to readily connect to the connection manager 220. Each interface module 208 in also configured to interface with a remote application 202 which may be a web browser connected to the interface module 208 through the Internet 40.

The connection manager 220 also interfaces with a plurality of port modules 222. Each port module 222 may be associated with one or more data sources 210 and is identified by a port module identifier and the data source 210 with which it is associated. The port module 222, connection manager 220, and interface module 208 may each have their own separate executable code. In a presently preferred embodiment, each of the port modules 222, connection manager 220, and interface modules 208 communicate with each other using TCP/IP protocol, which allows the present invention to be easily transported between various operating system platforms such as Unix, OS, or Windows.

The interface module 208 seeks a connection 224 with the connection manager 220 at the predetermined connection manager address. As will be discussed in greater detail below, the connection manager 220 will determine which data sources 210 are available to the remote application 202 and which port modules 222 are associated with each data source 210. The connection manager 220 will identify a port module 222 that is active, but not currently busy operating as the port or gateway to the database for an interface module 208. The connection manager 220 will return the port module identifier to the interface module 208 to allow the interface module 208 to establish a direct connection 226 with port module 222 and thus, the data source 210.

Instead of the connection manager 220 repeatedly having to communicate with each port module 222 and each interface module 208 involved with a data source query for multiple port modules 222 and interface modules 208, the connection manager 220 simply tracks which port modules 222 are busy. When the interface module 208 requests a port module 222 for connection to the data source 210, the connection manager 220 simply provides or identifies a location of an available port module 222 which can then communicate directly with the interface module. It will be appreciated by those of skill in the art that this configuration and method will eliminate information bottlenecks at the connection manager 220.

Figure 4:
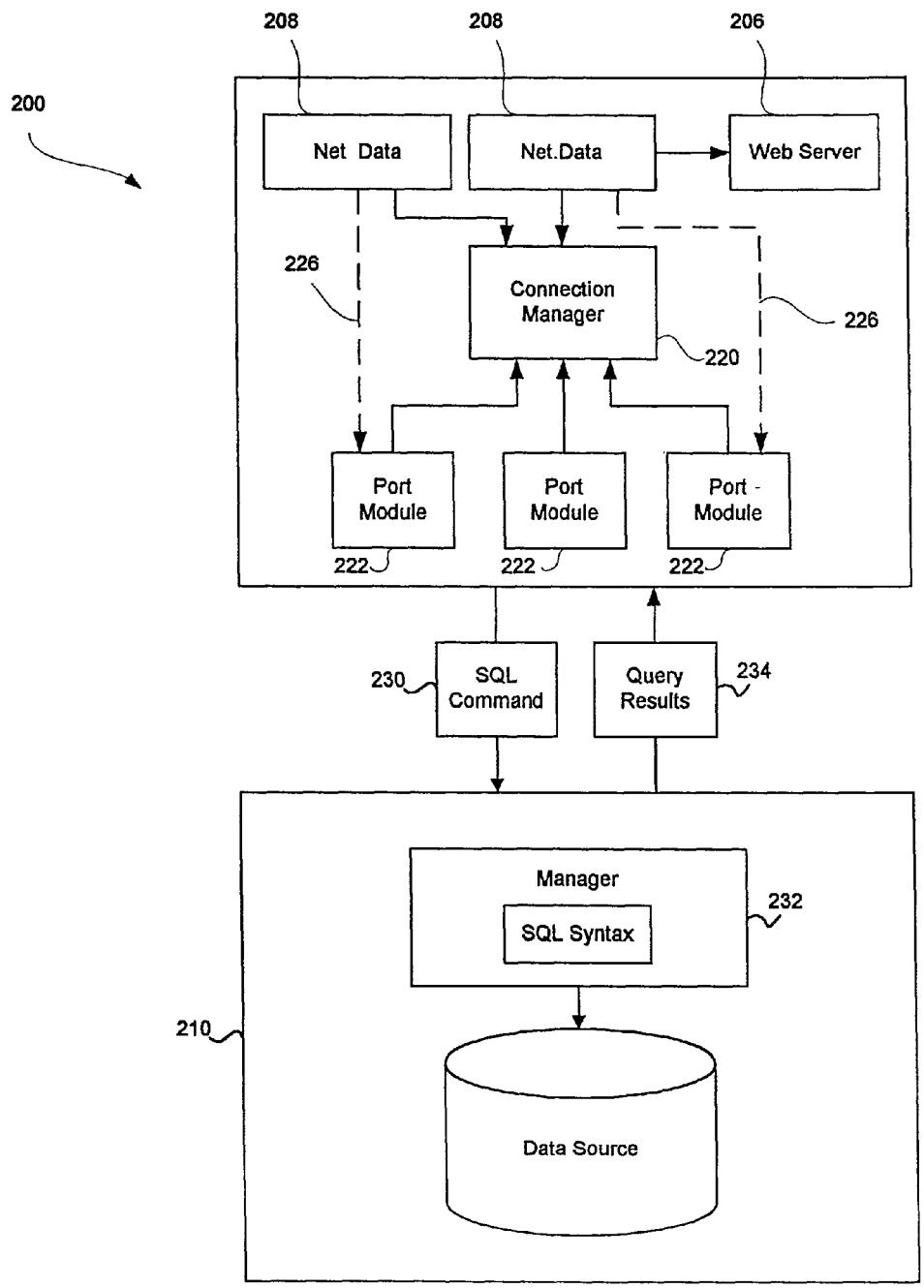
FIG. 4 is a schematic block diagram illustrating more details of the embodiment of FIG. 2.

Referring now to FIG. 4, a remote application connects to a web server 206 to request information from a data source 210 which in one preferred embodiment is on the server side. For most data sources, the request must be converted into an SQL command. The request is sent to an interface module 208 which reads the request and formats it into an SQL command. Both the web server 206 and the interface module 208 may be resident on the server side. Further, the web server 206 or the interface module 208 may convert the remote application request into an SQL query.

The connection manager 220 then determines an available port module 222 and returns the location of the port module 222 to the interface module 208. The request may then be sent as an SQL command 230 to the data source 210 directly through the port module 222. In one embodiment, the data source 210 may be a database system 210 such as a relational database, but hierarchical and object-oriented databases are also within the scope of this invention. In other preferred embodiments, data sources may include JAVA or PERL applications. In embodiments where data sources other than relational databases are used, the interface module 208 is configured to be compatible with such data sources in a supporting transaction and command language.

A database manager 232, such as DB2 manufactured by International Business Machines, receives the SQL command 230 and searches in the database 210 to retrieve query results 234 that satisfy the SQL command 230. The query results 234 may include any number of various files stored in a database 210 including text, values, characters, integers, and the like. Once the query results 234 are retrieved, the database manager 232 passes the query results 234 to the interface module 208 through the appropriate port module 222 connection. The interface module 208 may pass the query results 234 in an HTML format through the web server 206 to the remote application, which may be used to create a web page 212 on a web browser 202. This feature expedites retrieval of query results 214 and generation of the web page 204.

Accordingly, the interface module 208 is configured to be compatible with HTML as well as SQL transactions and commands 230. In one embodiment, the interface module 208 may be Net.Data, but one of skill in the art will appreciate that other computer gateway interfaces capable of supporting and interfacing HTML formats and SQL commands may be used as well.

Figure 5:
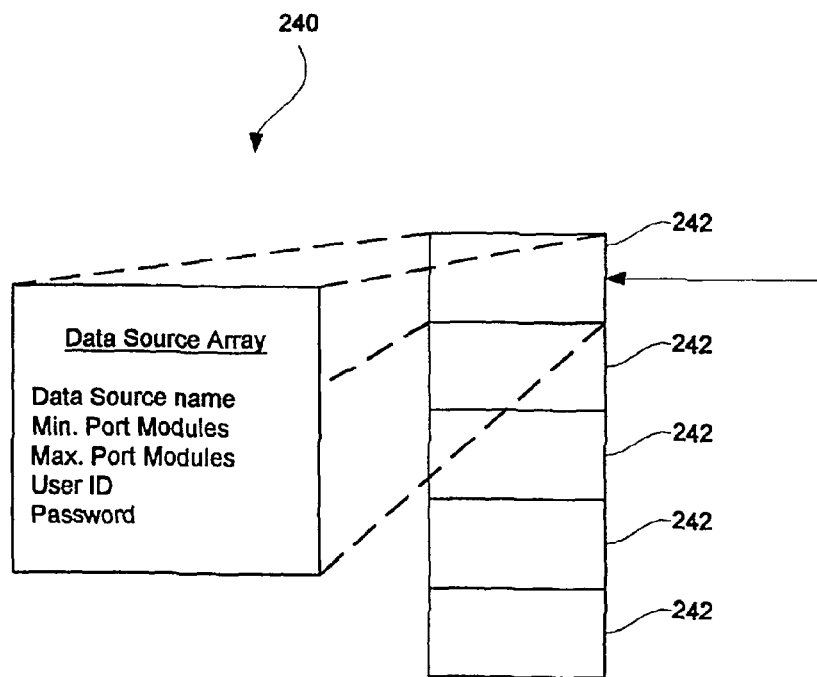
FIG. 5 is a schematic block diagram of a data structure for use in the system for connecting a plurality of remote applications with a data source.
Figure 6:
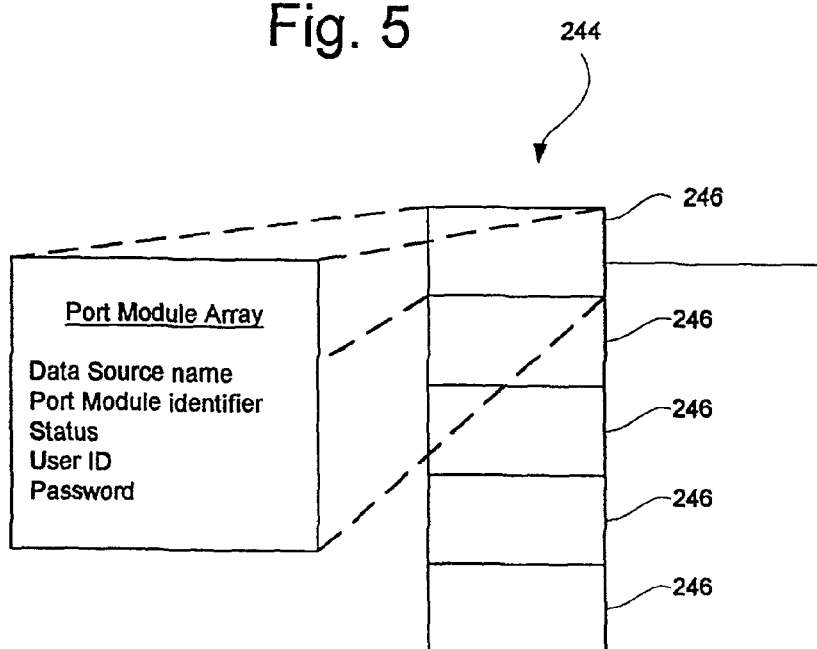
FIG. 6 is a schematic block diagram of a data structure for use in the system for connecting a plurality of remote applications with a data source.

Referring now to FIGS. 4, 5, and 6, each port module is known by an associated database and port module identifier. In one embodiment, a data structure 240 includes entries 242 containing the name of the data source 210, a minimum number of port modules 222 associated with the data source 210, and a maximum number of port modules 222 associated with the data source 210. In one presently preferred embodiment, the data structure is a data source array 240. It will be appreciated by those of skill in the art that any type of data structure or storage device may be used to store information of the type stored in the data source array 240.

A second data structure 244 indexes the data source array 240 and includes entries 246 containing data regarding each port module 222 associated with a particular data source 210. Each entry identifies which data source each port module belongs to, the port module identifier, and a status, which states whether the port module is busy or available. In a preferred embodiment, the data structure 244 is a port module array 244. It will be appreciated by those of skill in the art that any type of data structure or storage device may be used to store information of the type store in the port module array 244.

The connection manager 220 returns a port module identifier of an available particular port module 222 to the interface module by checking the availability status for the port module 222 associated with the data source 210 that is the object of the data request or SQL command 230. The availability status of a port module 222 may be determined by a number of factors. Upon initialization of the connection manager 220, the minimum number of port modules, as stored in the data source array 240 are launched and available for connecting to an interface module 208.

Once a port module 222 is connected to an interface module 208, that port module 222 is no longer available and its status changes to busy or unavailable. Once a busy port module 222 is no longer occupied by an interface module 208, its status is updated from busy to available and passed along to the connection manager for storage in the port module data structure 244. Each port module 222 may be configured to refresh or restart itself after a predetermined period of time, or after a particular event, such as the occurrence of an error.

In a presently preferred embodiment, each port module 222 is configured to know its availability status and continually report that status to the connection manager 220 for storage in the port module array 244. It will be appreciated by those of skill in the art that in this configuration, the connection manager 220 need not initiate contact with the data source 210 every time a request or SQL command passed from the interface manager 208. That would be time consuming, especially for data sources residing on main frames. Instead, the connection manager 220 need only determine the first port module 222 having an "available" status and pass the corresponding port module identifier to the interface module 208 for direct connection 226.

It will be appreciated by those of skill in the art that there are many ways for connection manager 220 to determine the first available port module 222. One such way includes storing the port module identifier for each available port module 222 in a queue (not shown). In one preferred embodiment, the queue may include a first-in-first out array. If the status of an "available" port module 222 changes, the associated port module identifier is removed from the queue. The connection manager 220, need only check the queue of "available" port module identifiers to find an available port module 222.

In one preferred embodiment, the connection manager 220 may be configured to launch additional port modules 222 up to the predetermined maximum number of port modules 222 for a particular data source 210; the number being stored in the data source array.

It will be appreciated by those of skill in the art that the storage of information such as that stored in the arrays 240, 244 may be accomplished in various ways using various data structures. It will further be appreciated that these arrays 240, 244 or data structures 240, 244 may be part of the connection manager 220, the port module 222, the interface module 208, or may be a separate module, and still provide the necessary information to enable a direct connection 226 between the interface module 208 and the port module 222 after the manner of the present invention.

In one preferred embodiment, communication between the interface module 208, connection manager 220, and the port module 222 may be subject to authentication as a security measure. It will be appreciated by those of skill in the art that the data source array 240 and/or the port module array 244 may also include user identification or password data for use in verifying or authenticated the relevant communications. It will further be appreciated that any such identification data may be part of a separate module, or hard coded into the system 200.

Figure 7:
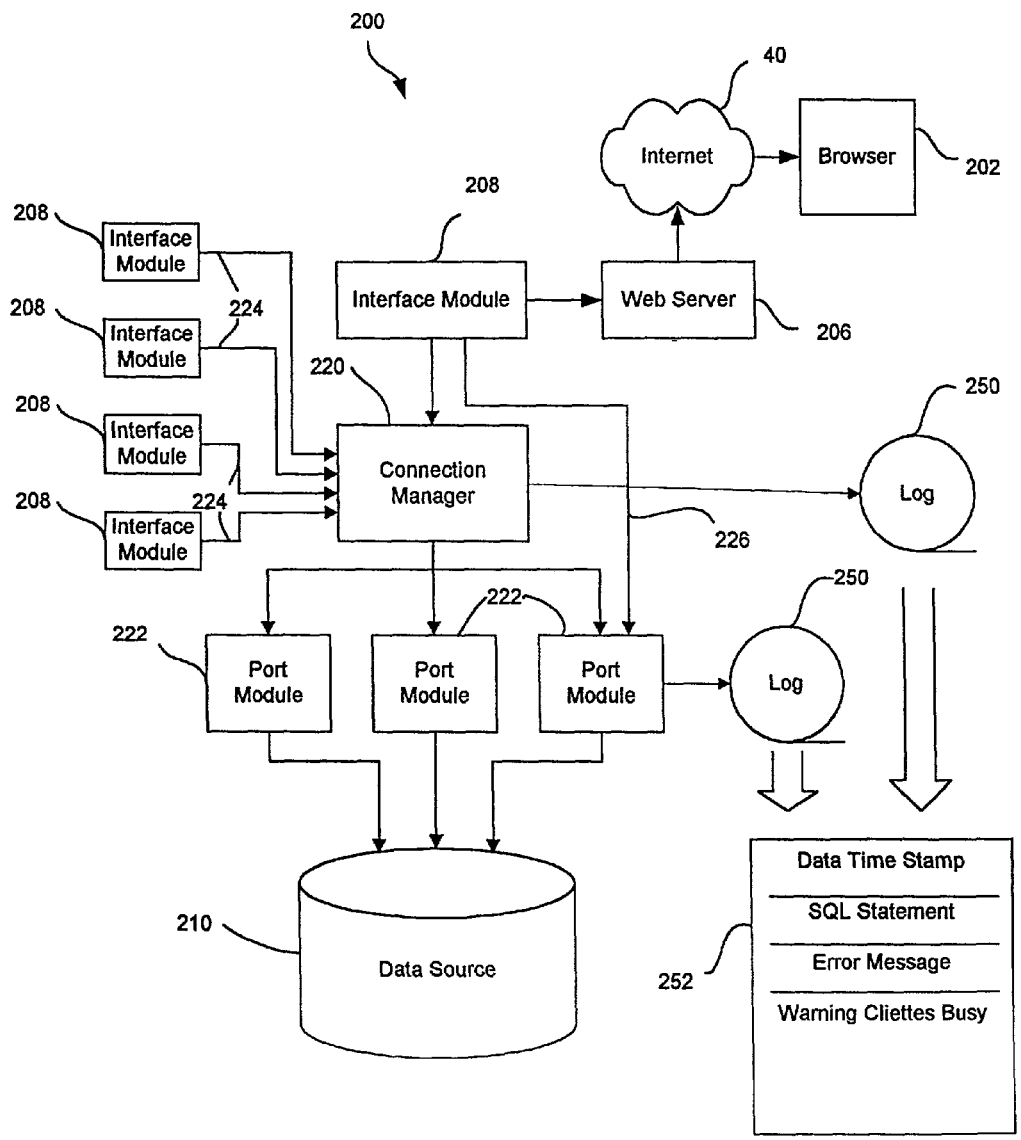
FIG. 7 is a schematic block diagram illustrating the components of an alternative embodiment for a system for connecting a plurality of remote applications with a data source.

Referring now to FIG. 7, one preferred embodiment of the present invention includes an arbitrary set of parameters, which may be embodied as a log file 250 associated with the connection manager 220 and each port module 222. Each log file 250 contains data 252 relating to the activity of the port module 222 and connection manager 220 to facilitate the tracking of data flow through the system 200. The data 252 in each log file 250 may include, for example, the date, time, a previous SQL statement or request, a present SQL statement or request, a number of rows, a warning message, an error messages, a feature database schema, a number of records, and the like. Because each port module 222 will have a port module identifier and data source identifier, a user may track the how many, and what type of, SQL statements passed to the data source 210. One may also determine the time of the last SQL statement or request to the data source 210 and other information at predetermined points in the process.

It will be appreciated by those of skill in the art that this information would facilitate debugging the system 200. For example, users at a remote application 202 that may be creating or programming a web page that utilizes data stored at a data source 210 may check the log files 250 to track down an error in the application.

Each port module 222 and the connection manager 210 writes to a log file 250, which in one preferred embodiment is stored as a flat file. In a presently preferred embodiment, the log file 250 has a maximum storage capacity of one megabyte. Once the log file 250 is full, another log file 250 may be generated. The log file 250 in accordance with the present invention is dynamic. The data 252 stored in the log files 250 is continually updated as the system 200 operates. It will be appreciated by those of skill in the art that various sizes or types of files can be used to store the data 252 contained in the log files 250. Of importance is the fact that the data 252 in the log files 250 is accessible to the remote application 202.

The log file 250 is configured such that a user at a remote location 202 can view the data 252 stored in the log files 250 on a screen, print out the data 252, or send it to another application. The user of a remote application 202 may also determine which of predetermined types of data will be stored in the log files 250. The user may set the log files 250 at a maximum level so that a maximus amount of data is stored in the log files 250. The user may also set the log files 250 to store a minimum level of data. It will be appreciated by those of skill in the art that the system 200 will run more efficiently when the amount of data 252 stored in the log file 250 is set to a minimal level.

In one preferred embodiment, the log file 250 stores a change in status of the data source 210 from active to inactive. Thus, the port module 222 knows whether the data source 210 was "down" the last time the port module 222 was connected to the interface module 208. When the connection manager 220 seeks to establish a connection with the data source 210 through the port module 222, the port module 222 will check the last status of the data source 210, to which it is assigned to determine whether the data source 210 was active or inactive. If the last detected status indicated that the data source was inactive or "down," the port module 222 will reestablish a connection with the data source 210.

The connection or reconnection between the port module 222 and the data source 210 may be transparent to the interface module 208. If the data source 210 is down, then the port module 222 will send the interface module 208 an error message stating that the data source 210 is down. When the data source 210 becomes active or is otherwise accessible again, the entire system 200 does not have to stop and restart in order to reestablish a connection between the interface module 208 and the data source 210. The port module 222, because it knows that the data source 210 was down during its last connection, will reestablish a connection with the data source.

One of skill in the art will appreciate that if the connection manager 220 had to reinitialize, all of the part modules 222 attached to the connection manager 220, even those whose connection to a respective data base was functioning fine, would reset, thus interrupting a data search. Thus, it is an advantage of the present invention for the port module 222 to be able to determine the last status of the data source 210, and be able to reconnect to its data source 210 without the connection manager 220 having to reinitialize. This enhanced error recovery makes the system more reliable. Most importantly, users see the system as more reliable and less temperamental, requiring less interaction.

Figure 8:
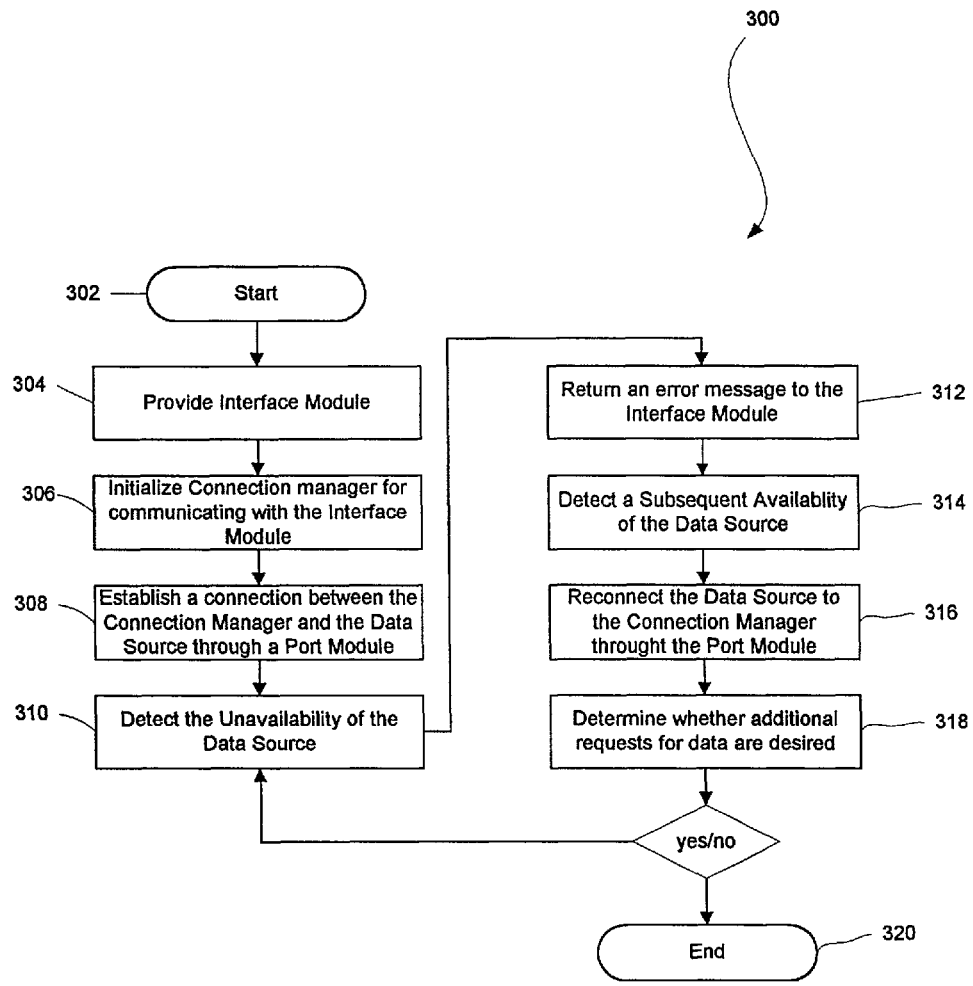
FIG. 8 is a flow diagram illustrating steps performed in one embodiment of a method in accordance with the present invention.

Referring to FIG. 8, a flow diagram 300 which incorporates one embodiment of a method of use of the system 200 of FIGS. 2-6. In step 302, the method begins. A remote application, such as the web browser 202 requests data from a data source 210. The request may be sent over the Internet 40 to the web server 206, which provides 304 the interface module 208 which translates the request into a suitable search command such as SQL.

The connection manager 220 is initialized 306 for communication with the interface module 208. The connection manager 220 establishes 308 a connection between the connection manager 220 and the data source 210 through the port module 222.

The port modules 222 serve as the connection port to the data source 210 for the interface module 208. The connection manager 220 facilitates the communication between the interface module 208 and the connection manager 220. The connection manager 220 establishes a connection with the port module 222 and detects 310 the unavailability of the data source 210. In one preferred embodiment, the unavailability of the data source 210 is detected by the port module 222. In another preferred embodiment, the unavailability of the data source 210 is detected by the connection manager 220. An error message is returned to the interface module 208. A subsequent availability of the data source 210 may then be detected 314 by the port module 222. In one preferred embodiment, the subsequent availability of the data source 210 is detected by the connection manager. The port module 222 is reconnected to the data source 210 through the port module 222, without having to initialize the connection manager 220.

In one preferred embodiment, the connections between the interface module 208, the connection manager 220, and the port module 222 are authorized to facilitate secured communications.

The method may then be repeated 310 for additional data source requests or queries. If there are no further requests, the remote application 202 disconnects from the server 206 and the method terminates 320.

The invention provides for the management of the connection between remote applications and a data source which alleviates bottlenecks in the data flow. The system and method of the present invention simplifies the connection between the remote application and the data source process by reducing the steps in the connection process. The system and method of the present invention eliminates the need to continually synchronize the interface module 208 with the port module 222 for each data source 210 request. The invention may be readily adapted to existing software applications such as web browsers, web servers, database management systems, operating systems and other modules disclosed herein.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for automatically re-establishing a connection to a data source accessible by a plurality of remote applications, the method comprising:
   providing at least one interface module configured to interface with a remote application;
   providing at least one port module configured to interface between the interface module and the data source;
   providing a connection manager to facilitate the interface between the interface module and the at least one port module;
   detecting unavailability of the data source, by the at least one port module, in response to an initial request for the data source by the remote application;
   dynamically detecting availability of the data source, by the at least one port module, in response to a subsequent request for the data source; and
   re-connecting the data source to the remote application in response to the subsequent request,
   wherein the at least one port module sends an error message to the interface module indicating the unavailability of the data source,
   wherein the at least one port module receives the subsequent request after the data source was detected to be unavailable in response to the initial request for the data source, determines that the data source was previously unavailable, and reestablishes a connection with the data source independent of re-initialization by the connection manager, and reconnects the remote application to the data source by directly communicating with the remote application.

2. The method of claim 1, wherein re-connecting further comprises re-establishing a connection between the at least one port module and the data source without re-initializing the connection manager.

3. A non-transitory computer readable medium having stored thereon computer executable instructions for performing a method for connecting a plurality of remote applications with a data source, the method comprising:
   providing at least one interface module configured to interface with a remote application;
   providing at least one port module to interface between the interface module and the data source;
   providing a connection manager to facilitate the interface between the interface module and the at least one port module;
   detecting unavailability of the data source, by the at least one port module, in response to an initial request for the data source by the remote application;
   dynamically detecting availability of the data source, by the at least one port module, in response to a subsequent request for the data source; and
   re-connecting the data source to the remote application in response to the subsequent request,
   wherein the at least one port module sends an error message to the interface module indicating the unavailability of the data source,
   wherein the at least one port module receives the subsequent request after the data source was detected to be unavailable in response to the initial request for the data source, determines that the data source was previously unavailable, reestablishes a connection with the data source independent of re-initialization by the connection manager, and reconnects the remote application to the data source by directly communicating with the remote application.

4. The computer readable medium of claim 3, wherein re-connecting further comprises re-establishing a connection between the at least one port module and the data source without re-initializing the connection manager.

5. A system for connecting a plurality of remote applications with a data source, the system comprising:
   an interface module configured to interface with a remote application;
   a port module, implemented by the processor, configured to interface between the interface module and the data source; and
   a connection manager module configured to facilitate an interface between the interface module and the port module, wherein:
   the port module further configured to detect unavailability of the data source in response to an initial request for the data source by the remote application, to dynamically detect availability of the data source in response to a subsequent request for the data source, and to re-connect the data source to the remote application in response to the subsequent request,
   wherein the port module sends an error message to the interface module indicating the unavailability of the data source,
   wherein the port module receives the subsequent request after the data source was detected to be unavailable in response to the initial request for the data source, determines that the data source was previously unavailable, reestablishes a connection with the data source independent of a re-initialization process by the connection manager, and reconnects the remote application to the data source by directly communicating with the remote application.

6. The system of claim 5, wherein re-connecting further comprises re-establishing a connection between the port module and the data source without re-initializing the connection manager.

7. The method of claim 1, further comprising connecting directly the interface module and the at least one port module for communicating independently from the connection manager in subsequent communications.

8. The computer readable medium of claim 3, further comprising connecting directly the interface module and the at least one port module for communicating independently from the connection manager in subsequent communications.

9. The system of claim 5, wherein the interface module and the port module are configured to be directly connected for communicating independently from the connection manager in subsequent communications.

10. The method of claim 1, wherein the port module reconnects the remote application to the data source without initialization by the connection manager.

11. The method of claim 1, wherein after receiving the subsequent request from the interface module, the at least one port module accesses a log file to determine the previous status of the data source.

12. The computer readable medium of claim 3, wherein after receiving the subsequent request from the interface module, the at least one port module accesses a log file to determine the previous status of the data source.

13. The system of claim 5, wherein after receiving the subsequent request from the interface module, the port module accesses a log file to determine the previous status of the data source.

\* \* \* \* \*